(12) United States Patent
Bucknell et al.

(10) Patent No.: US 7,992,548 B2
(45) Date of Patent: Aug. 9, 2011

(54) CRANKCASE VAPOR MANAGEMENT SYSTEM

(75) Inventors: John R. Bucknell, Royal Oak, MI (US); Michael Chapie, Washington, MI (US); John S. Jackson, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 150 days.

(21) Appl. No.: 12/248,089

(22) Filed: Oct. 9, 2008

(65) Prior Publication Data
US 2010/0089369 A1 Apr. 15, 2010

(51) Int. Cl.
*F02M 33/02* (2006.01)
*F02B 25/06* (2006.01)

(52) U.S. Cl. ......... 123/520; 123/518; 123/519; 123/574

(58) Field of Classification Search .................. 123/518, 123/519, 520, 572, 573, 574, 516
See application file for complete search history.

(56) References Cited

U.S. PATENT DOCUMENTS

| | | | | |
|---|---|---|---|---|
| 3,675,634 A * | 7/1972 | Tatsutomi et al. | | 123/519 |
| 3,779,224 A * | 12/1973 | Tagawa et al. | | 123/518 |
| 4,342,287 A * | 8/1982 | Concepcion | | 123/1 A |
| 4,630,575 A * | 12/1986 | Hatamura et al. | | 123/184.48 |
| 5,992,397 A * | 11/1999 | Hideaki et al. | | 123/538 |
| 6,227,037 B1 * | 5/2001 | Kawamura et al. | | 73/49.7 |
| 6,457,462 B2 * | 10/2002 | Moren | | 123/572 |
| 7,281,532 B2 * | 10/2007 | Kakimoto et al. | | 123/572 |
| 7,320,315 B2 * | 1/2008 | Amano et al. | | 123/520 |
| 2002/0020398 A1 * | 2/2002 | Kimoto et al. | | 123/519 |
| 2003/0136386 A1 * | 7/2003 | Itakura et al. | | 123/520 |
| 2005/0217645 A1 * | 10/2005 | Fukaya et al. | | 123/519 |
| 2007/0175455 A1 * | 8/2007 | Amano et al. | | 123/520 |

FOREIGN PATENT DOCUMENTS
DE 101 40 987 A1 3/2003
* cited by examiner

*Primary Examiner* — Erick Solis
*Assistant Examiner* — Sizo B Vilakazi
(74) *Attorney, Agent, or Firm* — Quinn Law Group, PLLC

(57) ABSTRACT

An engine assembly includes a vapor canister in selective fluid communication with a crankcase to store alcohol vapor when the temperature inside the crankcase causes alcohol accumulated in the crankcase to boil. The vapor canister is in selective fluid communication with an air induction system to recirculate the alcohol vapor through the engine in a metered fashion.

9 Claims, 1 Drawing Sheet

CRANKCASE VAPOR MANAGEMENT SYSTEM

TECHNICAL FIELD

This invention relates to systems for removing gases from engine crankcases.

BACKGROUND OF THE INVENTION

Internal combustion reciprocating engines may experience a condition known as piston blow-by, in which air and fuel in a combustion chamber are forced past piston rings and into a crankcase. Engines typically include a positive crankcase ventilation (PCV) system, which transmits the fuel from the crankcase to the intake manifold, where it is recirculated to the cylinders for combustion.

SUMMARY OF THE INVENTION

A vehicle includes a canister, a vapor adsorbent material inside the canister, an engine having a crankcase, and a conduit providing selective fluid communication between the crankcase and the vapor adsorbent material. In engines that use alcohol fuel, alcohol that accumulates in the crankcase may remain in liquid form after a cold start until the boiling temperature of the alcohol is reached. When the boiling point of alcohol is reached, a large volume of alcohol vapor may be produced in the crankcase. The vapor adsorbent material enables alcohol vapors from the crankcase to be stored and recirculated through the engine in a metered fashion.

A corresponding engine assembly is also provided. The engine assembly includes an engine block defining a plurality of cylinders, a crankcase mounted with respect to the engine block, an air intake manifold in selective fluid communication with the plurality of cylinders, a canister, and a vapor adsorbent material inside the canister. A first conduit provides selective fluid communication between the crankcase and the vapor adsorbent material. A second conduit provides selective fluid communication between the vapor adsorbent material and the air intake manifold.

A corresponding method is also provided. The method includes transferring vapor from a crankcase to a vapor adsorbent material, and storing the vapor in the vapor adsorbent material.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
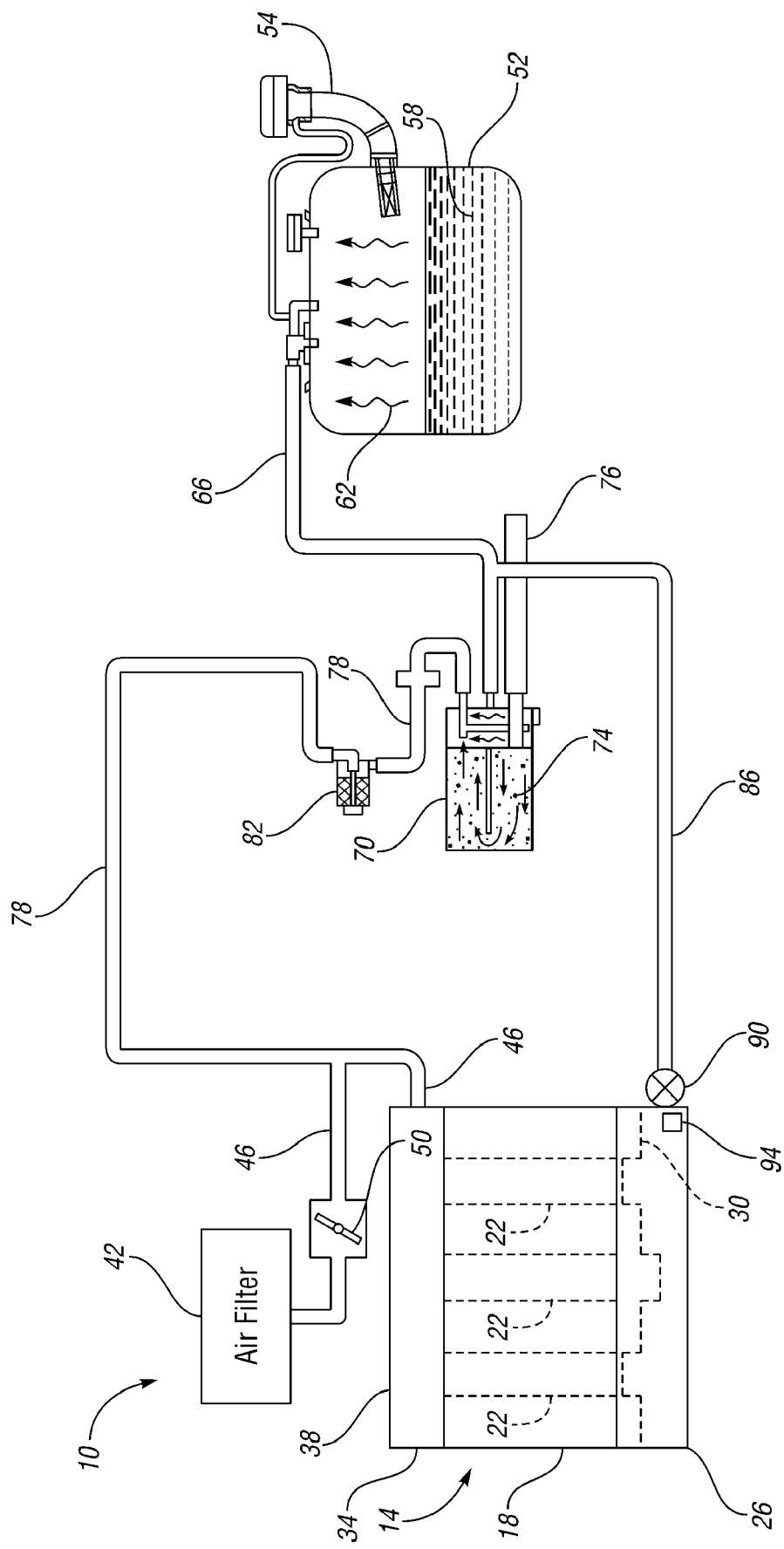
FIG. 1 is a schematic depiction of a vehicle including an engine, a fuel tank, and a vapor canister.

Referring to FIG. 1, a vehicle 10 includes an engine 14. The engine 14 includes an engine block 18 that defines a plurality of cylinders 22. A crankcase 26 is mounted with respect to the engine block 18 and contains a crankshaft 30. As understood by those skilled in the art, the engine 14 includes a plurality of pistons (not shown); each of the pistons is within a respective one of the cylinders 22 for translation therein. The pistons are operatively connected to the crankshaft 30 via connecting rods (not shown) such that translation of the pistons within the cylinders 22 causes rotation of the crankshaft 30.

The engine 14 also includes an air induction system 34, which includes an intake manifold 38, an air filter 42, and a conduit 46. The conduit 46 provides fluid communication between the air filter 42 and the intake manifold 38. The intake manifold 38 provides selective fluid communication between the conduit 46 and the cylinders 22. As understood by those skilled in the art, the low pressure created by the pistons during their respective intake strokes draws air from the atmosphere into the cylinders 22 via the air filter 42, the conduit 46, and the intake manifold 38. As understood by those skilled in the art, intake valves (not shown) control fluid communication between the cylinders 22 and the intake manifold 38.

The induction system 34 also includes a throttle valve 50 that is selectively movable to regulate the flow rate of air through the conduit 46. As used herein, a "conduit" includes any structure that defines a passageway for fluid flow. Exemplary conduits include, but are not limited to, hoses, pipes, ducts, etc. Furthermore, a "conduit" may also include one or more separate members operatively connected to one another and that cooperate to define a passageway. For example, a conduit may include a hose and a tube operatively connected to one another to provide fluid communication between devices.

The vehicle 10 also includes a fuel tank 52. Fuel tank 52 includes a fill tube 54 through which fuel 58 may be added to the fuel tank 52. In the embodiment depicted, fuel 58 contains ethanol, and may, for example, be a blend of 85% ethanol and 15% gasoline, known as "E85." Fuel 58 in the tank 52 may evaporate, producing vapors 62. A conduit 66 provides fluid communication between the tank 52 and an evaporative emissions canister 70. Canister 70 contains vapor adsorbent material 74, such as activated charcoal granules. The canister 70 is in fluid communication with the atmosphere via a venting conduit 76. Any gases that enter the canister 70 from the conduit 66 pass through the material 74 prior to exiting through the venting conduit 76. Accordingly, fuel vapors 62 from the tank 52 are absorbed by the material 74 as they pass through the canister 70.

A conduit 78 provides fluid communication between the material 74 in the canister 70 and conduit 46. Thus, conduit 78 and conduit 46 cooperate to provide fluid communication between the material 74 of canister 70 and the intake manifold 38. A solenoid valve 82 is operatively connected to the conduit 82, and is configured to selectively control the flow rate through conduit 78. When the solenoid valve 82 is in a closed position, the solenoid valve 82 prevents fluid communication between the canister 70 and the intake manifold 38. When the solenoid valve 82 is in an open position, the solenoid valve does not prevent fluid communication between the canister 70 and the intake manifold 38. The solenoid valve 82 is operatively connected to an engine control module (not shown) to be controlled thereby.

The canister 70 is configured such that conduit 76 and conduit 78 are in fluid communication with one another through the vapor adsorbent material 74. Thus, when the solenoid valve 82 is in the open position and the engine 14 is operating, low pressure in the intake manifold 38 causes air from the atmosphere to enter the venting conduit 76 and to pass through the material 74 in the canister 70. Fuel vapors absorbed by the material 74 mix with air as the air passes through the canister 70, and the air and fuel vapor mixture is transmitted by conduit 78 and conduit 46 into the intake manifold 38. The intake manifold 38 distributes the air and fuel vapor from the canister 70 to the cylinders 22 for combustion therein.

The engine 14 is configured to operate with fuel 58 that includes ethanol. As understood by those skilled in the art, fuel, and therefore ethanol, may accumulate in the crankcase 26 due to, for example, piston blow-by. The engine 14 includes a positive crankcase ventilation system (not shown), as understood by those skilled in the art, to remove fuel and other gases from the crankcase and direct them to the intake manifold 38 for recirculation to the cylinders 22.

Due to the distillation curve of alcohol fuels, any alcohol that accumulates in the crankcase 26 after a cold start will boil as the engine 14 heats up and the oil temperature reaches the boiling temperature of alcohol. The boiling of the alcohol in the crankcase 26 will introduce, almost instantaneously, a large volume of alcohol vapor into the PCV system and the induction system 34. Crankcase ventilation systems are designed to handle a relatively low volume flow rate of vapor; the alcohol present in the crankcase 26 after a cold start can overwhelm the crankcase ventilation system during the oil-temperature transition through the alcohol boiling temperature. Additionally, crankcase pressure may become excessive due to the sudden expansion of the alcohol if sufficient crankcase ventilation is not present.

A conduit 86 provides fluid communication between conduit 66 and the crankcase 26, and therefore conduit 86 provides fluid communication between the material 74 of the canister 70 and the crankcase 26. A valve 90 is operatively connected to the passageway 86 and is movable between a closed position in which the valve 90 prevents fluid communication between the passageway 86 and the crankcase 26, and an open position in which the valve 90 permits fluid communication between the crankcase 26 and the passageway 86. The engine 14 is configured so that the valve 90 is closed, thereby to prevent fluid communication between the crankcase 26 and the canister 70, during normal engine operation. During normal engine operation, crankcase gases are ventilated to the intake manifold 38 via the positive crankcase ventilation system. The engine 14 is also configured so that the valve 90 is open when at least one predetermined condition indicative of alcohol boiling in the crankcase exists.

In an exemplary embodiment, the at least one predetermined condition is the pressure inside the crankcase 26 exceeding a predetermined amount due to the boiling of alcohol in the crankcase after a cold start. For example, the valve 90 may be a pressure relief valve that is configured to automatically open when the pressure inside the crankcase 26 exceeds the predetermined amount. Alternatively, a series of check valves may be employed.

In another exemplary embodiment, the valve 90 is operatively connected to an oil thermostat 94 configured to measure the temperature of the oil inside the crankcase. When the temperature of the oil inside the crankcase 26 reaches the boiling temperature of alcohol, as measured by the thermostat 94, the thermostat 94 causes the valve 90 to open.

Accordingly, when the valve 90 is open, conduit 86 transports gases, including alcohol, from the crankcase 26 to the canister 70, where the alcohol is absorbed by the material 74. The alcohol may then be transmitted from the canister 70 to the intake manifold 38 in a metered fashion by opening the solenoid valve 82. When the solenoid valve 82 is opened, the alcohol from the crankcase 26 stored in the material 74 mixes with air from the venting conduit 76, and the air and alcohol is transported to the intake manifold 38. Thus, the solenoid 82 is operative to control the flow rate of the alcohol vapor. The engine control module (not shown) is programmed to control the solenoid 82 as oil temperature crosses the alcohol vaporization threshold.

Alternatively, and within the scope of the claimed invention, the canister 70 may be dedicated to receiving vapors only from the crankcase 26, without any direct fluid communication with the fuel tank 52.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a canister;
a vapor adsorbent material inside the canister;
an engine having a crankcase;
a first conduit providing selective fluid communication between the crankcase and the vapor adsorbent material; and
a first valve that is configured to prevent fluid communication through the first conduit when the first valve is closed, and to permit fluid communication through the first conduit when the first valve is open;
wherein the vehicle is configured such that the first valve automatically opens in response to the presence of at least one predetermined condition indicative of alcohol boiling in the crankcase.

2. The vehicle of claim 1, wherein the engine includes an air intake manifold, and wherein the vehicle further comprises a second conduit providing selective fluid communication between the vapor adsorbent material and the air intake manifold.

3. The vehicle of claim 2, further comprising a second valve mounted with respect to the second conduit and configured to selectively control fluid flow rate through the second conduit.

4. The vehicle of claim 2, further comprising:
a fuel tank; and
a third conduit providing fluid communication between the fuel tank and the vapor adsorbent material.

5. An engine assembly comprising:
an engine block defining a plurality of cylinders;
a crankcase mounted with respect to the engine block;
an air intake manifold in selective fluid communication with the plurality of cylinders;
a canister;
a vapor adsorbent material inside the canister;
a first conduit providing selective fluid communication between the crankcase and the vapor adsorbent material;
a second conduit providing selective fluid communication between the vapor adsorbent material and the air intake manifold; and
a first valve that is configured to prevent fluid communication through the first conduit when the first valve is closed, and to permit fluid communication through the first conduit when the first valve is open;
wherein the engine assembly is configured such that the first valve automatically opens in response to the presence of at least one predetermined condition indicative of alcohol boiling in the crankcase.

6. The engine assembly of claim 5, further comprising a second valve operative to control fluid flow through the second conduit.

7. The engine assembly of claim 5, further comprising a third conduit providing fluid communication between the vapor adsorbent material and the atmosphere; and wherein the canister is configured such that the first, second, and third conduits are in fluid communication with one another through the vapor adsorbent material.

8. The engine assembly of claim 5, wherein the at least one predetermined condition includes the pressure inside the crankcase exceeding a predetermine amount.

9. The engine assembly of claim 5, wherein the at least one predetermined condition includes the temperature inside the crankcase exceeding a predetermined amount.

* * * * *